Feb. 2, 1965  J. SNEED  3,168,320
DYNAMIC SEALING PACKING FOR POLISH RODS AND THE LIKE
Filed May 3, 1962  2 Sheets-Sheet 1

INVENTOR.
JOHN SNEED
BY
ATTORNEYS

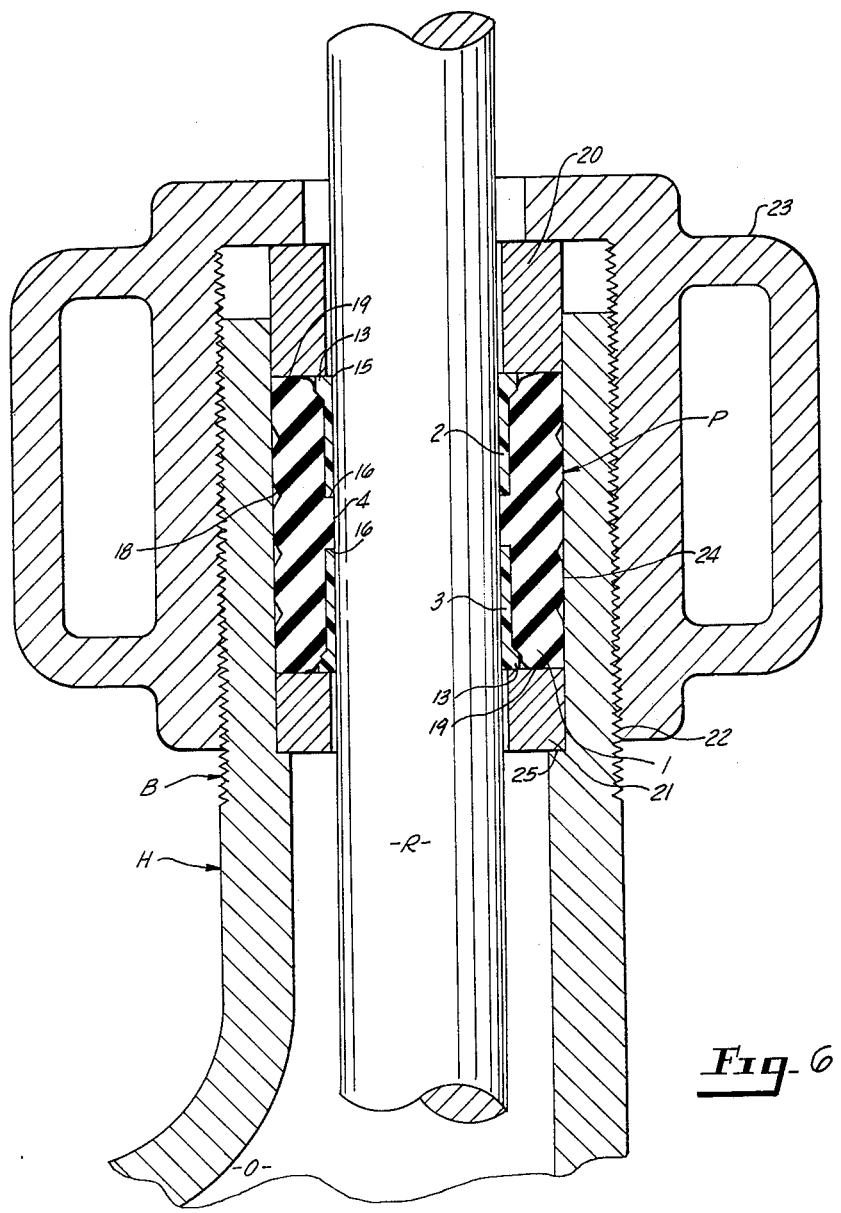

United States Patent Office 3,168,320
Patented Feb. 2, 1965

3,168,320
DYNAMIC SEALING PACKING FOR POLISH RODS
AND THE LIKE
John Sneed, 18925 Prevost St., Detroit 35, Mich.
Filed May 3, 1962, Ser. No. 192,128
8 Claims. (Cl. 277—110)

This invention relates to packings for stuffing boxes and to fluid seals to prevent leakage past or around shafts, stems, rods, plungers and the like of such devices as pumps, valves and fluid motors. A particular embodiment of my invention which is illustrative of its nature, modes and advantages comprises a packing and seal for the reciprocating "Polish Rod" of a petroleum well pump, and the same will be the subject of my specific description as the preferred form and exemplification of my invention.

It is common practice in the production of petroleum oils (where pumping is required) to install a reciprocating pump deep in the casing of the well and preferably below the natural level of the oil pool and to connect the operative mechanism of the pump, through a "sucker rod" to the power source at casing head of the well to raise the oil to the surface, whence it is then forced, often through long lengths of small pipe, to pipe lines or storage tanks or vessels. Often a considerable fluid pressure is required at the casing head or surface of the well to force the oil against line friction and static head on to the point of discharge or delivery from the pump.

A stuffing box with a packing and gland is, therefore, required and installed at the casing head to prevent the escape of oil around the polish rod especially while it is reciprocating in the packing. The polish rod is often a highly finished rod of bronze, steel or plated steel to minimize wear on and/or with the packing. The packing must be very reliable and durable and must seal the casing against leakage throughout a range of fluid pressures from very high, possibly 500 pounds per square inch to vacuum. Reliability is extraordinarily necessary due to the fact that the pumper usually visits the well only about one in every 24 hour period. If failure of the packing seal should occur shortly after he has left the well, much of a 24 hour production period would be pumped out on the ground and lost. Likewise, if the packing seals are not durable, frequent shutdowns of the well are required to change the seals with resultant loss of production.

The petroleum oil being pumped from wells "on the pump" is not necessarily or continuously free of entrained solid or abrasive matter which tends to enter the packing and remain to score the polish rod and/or chew and abrade the packing. Often the packing employed for sealing and sliding coaction with the polish rod is required to be inordinately compressed to prevent leakage and, therefore, tends to wipe off the lubricating liquid within the length thereof and/or so that only dry sliding or harmfully galling contact is effected. According to prior practice the seals which were sometimes squeezed enough at the near and wet end of the packing for satisfactory sealing were therefore pressed too tightly and into excessive frictional engagement with the rod at the dry and far end.

Generally speaking, the problem of sealing the polish rod has been that the packings which affected a desirable, fluid-tight seal tended to be self-destructive, whereas the packings which endured tended to leak.

The art of sealing polish rods has been complicated by the desirability and/or necessity of applying and removing the packing and seal laterally about the rod to avoid disconnecting the polish rod to permit a seal or packing to be slipped over an exposed end of the rod. This has imposed the problem long endured in the piston ring art, for example, of sealing the severed ends of the sealing elements upon or in respect to themselves as well as affecting the desired seal between the packing and the rod.

The art of sealing polish rods and the like has also been plagued with the fact that rubber-like materials which have desirable qualities of resilient yielding to accommodate themselves to sealing shapes and positions in the stuffing box are deficient with respect to their antifrictional and wear resistant values and characteristics, especially in the absence of desirable or available lubrication and/or when confronted with abrasive action.

It is an object of my invention to correct the weaknesses and solve the problems of the prior art, and to make a packing which can be used in existing equipment and be installed in a manner similar to prior practice, but which will substitute a long wearing, bearing-like material for rod contact which will increase life and reliability.

A particular object is to provide a packing which automatically "breaks-in" to an optimum, long-range, sealing relationship with the rod or shaft to be sealed, and also affords a satisfactory seal in the first instance and during a "break-in" period.

Another specific object is to provide a seal for the split ends of my sliding sealing members and provide for their optimum sealing relation with the rod or shaft to be sealed until such members are substantially worn out.

A further object is to provide novel and useful coactions between static and sliding sealing elements in a packing and to employ static stressed resilience of the one to promote dynamic sealing work by the other while the latter contributes to the confinement and maintenance of stress in the former.

These and other objects will more fully and at large appear from the following description of a preferred form and embodiment of my invention, reference being had to the accompanying drawings in which:

FIGURE 6 is a longitudinal sectional view of my packing disposed in a stuffing box on the casing head of a well in working relation to the polish rod extending therethrough and slideably sealed therein.

Figure 1:
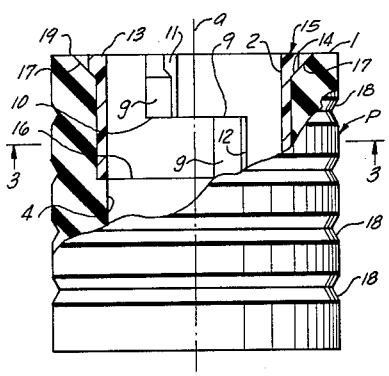
FIGURE 1 is an elevation, partly in longitudinal section of the assembled parts comprising the packing of my invention.
Figure 3:
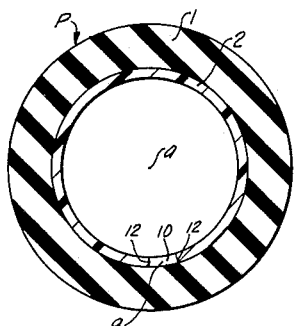
FIGURE 3 is a transverse section of the packing of FIG. 1 taken in the plane of the line 3—3 thereof.
Figure 4:
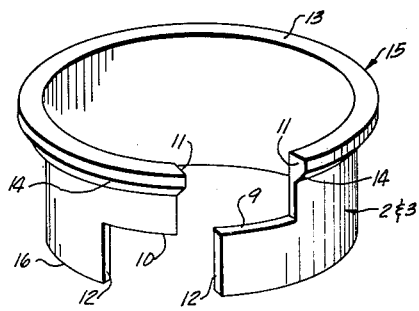
FIGURE 4 is a perspective view of one of the inner collars of my packing.
Figure 5:
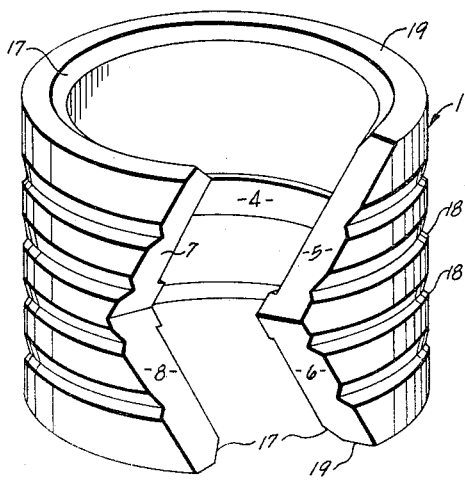
FIGURE 5 is a perspective view of the outer sleeve part of my packing.

In this preferred form of my invention, my packing P comprises an outer, substantially right circular cylindrical, thick-walled, rubber-like, relatively soft sleeve part 1, see FIGS. 1, 5 and 6, and two inner, equal and oppositely disposed, nylon-like, relatively hard, low-friction collar or ring parts 2 and 3, see FIGS. 1–4 and 6, all coaxially disposed; the collars 2 and 3 being separated longitudinally in the sleeve 1 by the integrally formed, internally disposed, annular rib 4 which has a radial thickness in its idle state about equal to the thickness of the walls of the collars adjacent thereto.

As shown in FIGS. 4 and 5 the sleeve and collars are split circumferentially to admit of sidewise attachment to and detachment from the polish rod R, FIG. 6. I prefer that the sleeve 1 have a double inclined cut exposing convexly angled surfaces 5 and 6 and mating concavely angled surfaces 7 and 8 which when in mutual contact have tight sealing engagement with each other when the sleeve is squeezed axially and constrained radially. Each of the equal rings 2 and 3 are split with a widely stepped end cut comprising circumferentially extending, coextensive planar radial surfaces 9 and 10 lying normal to the axis *a* of the assembled packing P, FIGS. 1–3, at about mid-length of the ring, and the split ends of each of the rings also comprising the juxtaposed, axially extending, circumferentially spaced pairs of surfaces 11 and 12 abruptly angled to the surfaces 9 and 10 and forming relatively offset circumferential gaps *g* therebetween; the pair of surfaces 11 severing also the outwardly disposed radially thickened brim 15 of each ring, whilst the pair of surfaces 12 sever the inward ends 16 of the rings, i.e. the ends disposed near the middle of the packing and engaging the opposite end edges of rib 4 of the sleeve 1, FIGS. 1 and 6. When the packing is new and first goes to work in engagement with the rod R, the surfaces 11 and 12 respectively should be spaced apart about 3 to 4 times the least wall thickness of the rings 2 and 3 so that they may be reduced circumferentially freely as they yield thickness due to wear. I prefer that the surfaces 9 and 10 especially be formed with a smooth, straight-edged, sharp shear, or otherwise to make them smooth and substantially planar and coextensive so that they may close tightly and slide freely upon each other in sliding, substantially leak-proof, fluid-tight engagement while the rings change, or are free to change, their circumferential length to maintain, or while maintaining, sealing contact and engagement with the rod R whilst the latter reciprocates in the packing, FIG. 6.

The outward thickened brim ends 15 of the rings 2 and 3 are no less than about twice as thick radially as the wall thickness of the balance of the walls of the rings which are otherwise of uniform thickness; the interior surface of the rings and brims presenting a smooth, continuous, true, right circular cylindrical surface, except for the gaps *g*, to the corresponding cylindrical surface of the rod R. The thickened brims 15 of the rings present an external, flat end surface 13 normal to the axis *a* of the packing for engagement with the glands or gland rings 20 and 21 of the stuffing box, see FIG. 6, and the brims 15 have an outwardly and rearwardly disposed and inclined, beveled surface 14 for congruent engagement with the inwardly chamfered parts 17 of the ends of the sleeve 1.

The sleeve 1 is longer than the sum of the lengths of both of the rings 2 and 3 by approximately the longitudinal extent of the inner rib 4 upon the opposite ends of which the inner ends 16 of the rings have forcible engagement and loadbearing contact when my packing has working and sealing engagement with the polish rod R, FIG. 6. Externally the sleeve 1 is right circular cylindrical except for a plurality of annular circumferential V-shaped grooves 18 by virtue of which the sleeve may be compressed (i.e. foreshortened) axially while confined radially and circumferentially, and put in a state of resilient compression by forcing the material of the sleeve to tend to yieldingly fill or partially fill the grooves. The end surfaces 19 of the sleeve 1 radially outwardly of the chamfered surfaces 17 are normal to the axis *a* of the packing and lie approximately flush with the end surfaces 13 of the brims 15 of the rings 2 and 3 when the rings and sleeves are assembled in free close association, FIG. 1, as on the rod R in the first instance, and also when the packing is compressed into its operative sealing relating with the rod R within the stuffing box B on the upper end of the casing head H as shown and suggested in FIG. 6.

In FIG. 6 the casing head H may take its familiar form with a side outlet O through which petroleum is discharged from the casing of the well, not shown, under the sometimes high pressure required to move the petroleum to its immediate designation.

The upper portion of the casing head, upward also as viewed in FIG. 6, comprises the stuffing box B through which the polish rod R has its reciprocating motion to transmit working force and motion to the pump in the well. The stuffing box part of the casing head has external threads 22 coacting with the internal threads of the gland nut 23, and comprises also the internal counterbore 24 receptive of the lower gland or washer 21 upon the shoulder 25, along with the packing P and the upper gland or washer 20 which by its engagement with the nut 23 facilitates axial compression of the packing P between the glands 20 and 21. The glands 20 and 21 each have a close sliding fit with the counterbore 24 of the stuffing box whereby to contain the relatively soft and rubber-like material of the sleeve during forcible axial compression thereof. The glands 20 and 21 also and simultaneously engage the end faces 13 of the rings 2 and 3 as well as the end faces 19 of the sleeve whereby the engaged rings also serve to contain the rubber-like material of the sleeve from extrusion near the polish rod or between the rod and the holes in the glands. According to usual practice the glands 20 and 21 are pre-assembled with the polish rod R and have a free to a loose sliding fit therewith to avoid scuffing or scoring the same, consistent, however, with their tending to maintain coaxial alignment between the stuffing box portion of the casing head and the polish rod should these parts depart or tend to depart from benign coaxial alignment with the stuffing box B and packing P. The glands 20 and 21 may, according to common practice, be made of bronze or graphite bronze for non-abrasive transitory contact with the polish rod and for satisfactory coaction with my packing and the stuffing box.

When my packing has been encircled about the polish rod outside of the stuffing box and below the gland 20; the nut 23 being entirely unscrewed and restrained adequately above the assembly and the gland 21 resting on the shoulder 25, for example, then when the packing P is slid down the polish rod and into the stuffing box the exterior diameter of the packing will preferably have a nice sliding, entering fit with the counterbore 24 whilst the interior surface of the collars or rings 2 and 3 and the interior surface of the rib 4 have a close to snug sliding fit with the polish rod. Thereafter, as the gland nut 23 is screwed down on the threads 22 and forcibly engages the gland 20, the packing P, its sleeve and rings, will be subjected to axial compression tending to thicken the whole packing radially and reduce the radial clearances between all of the parts of the packing, the rod and the counterbore 24 of the box and to reduce the open volume of the grooves 18 whereby to create a stressed state of compression in the sleeve 1 which acts to force the collars 2 and 3 into "no-clearance" contact with the polish rod and tends to force the inner cylindrical face of the rib 4 into snug sealing engagement with the polish rod.

At the same time and by the same forcible motion of the gland rings 20 and 21 toward each other as urged by the nut 23, the thickened ends 15 of the rings 2 and 3 are forcibly engaged by the glands 20 and 21 as mentioned above, and the inner ends 16 of the rings or collars 2 and 3 are forcibly engaged with the opposite end edges or shoulders of the rib 4, tending to squeeze the rib longitudinally and also to gain by coaction with the axially and radially compressed rib 4 a desirable tight, leak-proof sealing and sliding contact between the circumferentially extending surfaces 9 and 10 of the stepped, split ends of the rings.

Figure 2:
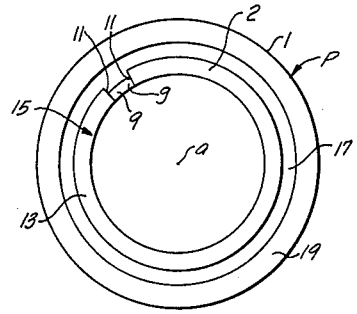
FIGURE 2 is a top plan view of the packing of FIG. 1.

When the parts are first assembled as shown in FIG. 6, and suggested in part in FIGS. 1–3, the rib 4 by virtue of its relative softness and compressed deformation will tend to have the more intimate and more effective sealing contact with the polish rod in the first instance. When the packing is newly installed the rib 4 may be the main or sole effective seal with the polish rod, and may suffer relatively rapid wear by virtue of its short longitudinal length, softness and pressed contact with the rod. In this initial period one can assume that the major sealing burden is carried by the rib because the rings 2 and 3 have not then or yet necessarily worn or become adapted to their best "broken-in," full-working, substantially no-clearance coaction with the rod. At this time the rib 4 will be, or tend to be, wetted by the pumped fluid which may pass the lower ring 3, and the rib will then be preserved in an automatically and benignly timed relation to the wearing-in of the collars 2 and 3. That is to say: the longer it may take the collars or rings to assume their full sealing responsibility, the longer the rib 4 will be preserved to do the sealing work.

Conversely, and with "nice" advantage, as the collars 2 and 3 become broken-in and the collar 3 especially, wipes the rod with increasing efficiency, less lubricant will be afforded the rib 4 so that its wear is hastened and drag on the rod reduced as the collars 2 and 3 take over the sealing work. It is a specific advantage of my invention that this substantially automatic balance and transfer of responsibilities between the rib and the collars takes place while a fine fluid seal with low frictional drag is continuously maintained. And while this advantage may be relatively modest with new and very smooth polishing rods, it becomes increasingly great and important when my packing is employed for replacement on old, rough, worn or scored rods that have suffered the slings and arrows of misfortune association with prior art packings and/or deleteriously abrasive fluids. It is a concomitant advantage of my invention that while only a relatively modest stressed compression need be set up in the sleeve 1 to break in my packing for fine efficient sealing coaction with a round, true and smooth rod, my invention is capable of performing its break-in operation in the same way in kind when much greater stressed compression is needed in and imposed upon the sleeve to meet more adverse conditions involving rougher and generally more miserable polish rods.

While the beneficent inward radial bulging of the rib 4 has been going on as described above, a portion of the sleeve adjacent the gaps g also tends to bulge inwardly toward or into contact with the rod without, however, effecting the mode of operation or results of my invention adversely. Generally speaking, bulging of sleeve material into the gaps g is restrained by the internal cohesion and resilience of the material and the small size and shape of the gaps. As a practical matter, the gaps have a function in respect to the stressed sleeve similar to and supplementary of the external V grooves 18. As the packing and the rings thereof wear, and as the sleeve is subjected to greater axial compression and given greater radial expansion, the gaps g become correspondingly smaller and maintain a benign restraint upon inordinate inward bulging of the sleeves therethrough. So much of the rib 4 as may bulge longitudinally into the gaps between the adjacent surfaces 12 will suffer and function along with the rib. The internal cohesion of the material of the sleeve and the spacing of the chamfered surface 17 from the rod and from the clearance between the rod and the glands inhibits deleterious bulging into, or deleterious extrusion of sleeve material through, the gaps between the surfaces 11 and/or adjacent the split ends of the brims 15.

I have successfully embodied my invention in sizes and proportions substantially as shown in the drawings, and by way of specific example, say: For a polish rod of 1⅜ inches outside diameter I provided a sleeve in which the rib 4 was of 1⅜ inches inside diameter, and of ⅜ inch axial length, and the sleeve was otherwise of 1½ inches inside diameter to receive the collars 2 and 3; the sleeve being 2¼ inches outside diameter and 2¼ inches long and having four external V-shaped 90° grooves ⅛ inch deep equally spaced from each other and from the ends of the sleeve. The chamfered surface 17 was pitched at 45° to an O.D. of 1⅞ inches. The rings or collars 2 and 3 were identical with each other, each being about 15/16 inch long and having about 1/16 inch wall thickness apart from the brims which were about ⅛ inch thick and about ⅛ inch long. The collars were initially formed as closed rings about 1 13/32 inches O.D. and when split and expanded into the sleeve, FIG. 1 made the gaps g about 3/16 inch to ¼ inch long, i.e., about pi times the wall thickness.

In this example and with these dimensions the sleeve was made of neoprene of about 50 to 70 "Shore A" durometer hardness with a tensile strength of from about 1500 to 2000 pounds per square inch. The rings 2 and 3 were molded of nylon. Equivalent materials for performing the functions and coactions played by the several parts of my packing will suggest themselves to those skilled in the art; natural or synthetic rubber substituting for neoprene where contact with rubber-destructive fluids such as petroleum is not to be encountered. Polyethylene and Teflon suggest themselves for nylon alternates or substitutes within and/or because of their known properties and limitations. I contemplate also that the rings or collars could be made of lead, cadmium or similar metals, or made of more resilient metals coated with lead, cadmium or the like for particular services and employments wherein, for example, the rod or shaft to be sealed with my packing were made of materials more compatible with such metals than with the plastics which I presently prefer.

While I have illustrated and described a preferred form of my invention, changes, modifications and improvements will probably occur to those skilled in the art who have come to understand my teachings and enjoy the benefits of my invention. Therefore, I do not want to be limited in the scope of my patent to that form of my invention herein specifically illustrated and described, nor limited in any other manner inconsistent with the progress by which my invention has promoted the art.

I claim:

1. Packing for a sliding fluid seal with a movable member adapted to have sliding and fluid sealing engagement therewith, comprising a right cylindrical, thick-walled, rubber-like, sleeve having a central axis and having ends normal to said axis and adapted to have coaxial engagement with said member and be compressed axially and thickened radially under axial compression, said sleeve having an annular rib of limited radial thickness spaced axially between said ends and adapted to slidably engage said member and having axially extending surfaces between said rib and said ends, said packing also comprising separate, longitudinally split, relatively thin-walled, nylon-like sleeves with separated, proximate, relatively movable circumferential ends and with radial wall thickness similar to the thickness of said rib and removably disposed in close movable contact with said surfaces between said rib and said ends of said rubber-like sleeve and adapted to slideably engage said member, proximate axial ends of said nylon-like sleeves engaging said rib axially when the other axial ends of said nylon-like sleeves are substantially flush with the said ends of said rubber-like sleeve whereby axial compression exerted simultaneously upon all the sleeves tends to expand said rib into tight contact with said element and move the said circumferential ends of said nylon-like sleeves relative to each other and to said rubber-like sleeve and constrain said nylon-like sleeves into tight contact with said element and said rib.

2. The packing according to claim 1 wherein said rib and said nylon-like sleeves are disposed internally of said rubber-like sleeve and the latter are constrained to smaller diameters when said rubber-like sleeve is compressed axially.

3. The packing of, according to claim 2, wherein the said circumferential ends of said nylon-like sleeves have axially overlapping portions in forcible circumferentially sliding contact when the packing is axially compressed.

4. The packing of according to claim 1, wherein the said circumferential ends of said nylon-like sleeves have axially overlapping portions in forcible circumferentially sliding contact when the packing is axially compressed.

5. Packing for a sliding fluid seal with a movable member adapted to have sliding and fluid sealing engagement therewith, comprising a cylindrical, relatively soft and thick-walled, rubber-like, sleeve having a central axis and having ends substantially normal to said axis and adapted to have coaxial engagement with said member and be compressed axially and thickened radially under axial compression, said sleeve having parts of greater and lesser radial thickness with one part of lesser radial thickness adjacent one of said ends, said packing also comprising a separate, longitudinally split, relatively hard and thin-walled, nylon-like sleeve with separated, relatively movable circumferential ends and having radial wall thickness similar to the difference between the thicknesses of said parts of said rubber-like sleeve and removably disposed in close movable contact with said one part of said sleeve and adapted to slidably engage said member; one axial end of said nylon-like sleeve engaging the other and thicker part of said rubber-like sleeve axially when the other axial end of said nylon-like sleeve is substantially flush with the said one of said ends of said rubber-like sleeve whereby axial compression exerted simultaneously upon both sleeves tends to expand said thicker part of said rubber-like sleeve and press said nylon-like sleeve into sealing contact with said element.

6. The packing of claim 5 wherein the said circumferential ends of said nylon-like sleeve are stepped and have mutual overlapping, sliding, axial engagement along circumferential surfaces normal to said axis enhanced by axial compression of said sleeves.

7. The packing of claim 6 wherein said rubber-like sleeve has a beveled-off portion at said one of said ends and said nylon-like sleeve has a radial flange-like portion at its said other axial end overlying said beveled-off portion.

8. Packing for a movable polish rod or the like adapted to be compressed axially between glands in a stuffing box into sliding and fluid sealing engagement with the rod, comprising a relatively soft and thick-walled, rubber-like, outer sleeve having its opposite ends engageable with such glands and adapted to be compressed axially therebetween and thickened radially under axial compression, said sleeve having an internal annular rib of limited radial thickness spaced axially from the said ends of said sleeve, said packing also comprising separate, split, relatively hard and thin-walled, nylon-like, low-friction, inner sleeves with axially overlapping, circumferentially spaced ends and having radial wall thickness similar to the thickness of said rib and removably disposed within said outer sleeve between said rib and the ends of said outer sleeve, proximate axial ends of said inner sleeves engaging said rib axially when the remote axial ends of said inner sleeves are substantially flush respectively with the opposite ends of said outer sleeve and adapted to engage said glands simultaneously with said outer sleeve, said rib having a smaller area for engagement with the polish rod than said inner sleeves and tending to be worn more rapidly by such engagement than said sleeves whereby to tend to yield increasing sealing functioning to said inner sleeves as the packing is worn.

References Cited by the Examiner

UNITED STATES PATENTS

| | | | |
|---|---|---|---|
| 1,928,259 | 9/33 | McCabe | 277—227 |
| 2,041,316 | 5/36 | Bennett | 277—4 |
| 2,243,439 | 5/41 | Pranger et al. | 277—4 X |
| 2,499,952 | 3/50 | Harbison | 277—220 |
| 2,765,023 | 10/56 | Fagg et al. | 277—212 X |
| 2,896,980 | 7/59 | Dicky | 277—119 |

FOREIGN PATENTS 1,193,987   11/59   France.

EDWARD V. BENHAM, *Primary Examiner.*
SAMUEL ROTHBERG, *Examiner.*